United States Patent
Gordon

[11] Patent Number: 6,062,333
[45] Date of Patent: May 16, 2000

[54] RIDING MOWER WITH PIVOTING FRONT WHEEL ASSEMBLY

[75] Inventor: Todd B. Gordon, Camden, N.Y.

[73] Assignee: Ferris Industries, Inc., Munnsville, N.Y.

[21] Appl. No.: 08/898,801

[22] Filed: Jul. 23, 1997

Related U.S. Application Data

[60] Provisional application No. 60/022,865, Jul. 27, 1996.

[51] Int. Cl.[7] .............................. B60G 9/02; B62D 21/02; B62D 49/00
[52] U.S. Cl. .................................. 180/311; 280/124.111; 280/124.113; 280/781; 56/14.7
[58] Field of Search ..................... 280/124.111, 124.113, 280/124.112, 124.106, 781, 797, 104; 180/6.48, 311, 312; 56/14.7, 15.8

[56] References Cited

U.S. PATENT DOCUMENTS

| | | | |
|---|---|---|---|
| 1,826,113 | 10/1931 | Winsor | 280/124.113 |
| 2,805,079 | 9/1957 | Vostrez | 280/124.111 |
| 2,874,972 | 2/1959 | Andersen et al. | 280/124.113 |
| 3,408,089 | 10/1968 | Edwards | 280/99 |
| 3,686,840 | 8/1972 | Root | 56/15.8 |
| 4,077,191 | 3/1978 | Pittinger, Sr. et al. | 56/12.7 |
| 4,106,269 | 8/1978 | Knudson | 56/15.8 |
| 4,301,881 | 11/1981 | Griffin | 180/6.48 |
| 4,809,796 | 3/1989 | Yamaoka et al. | 180/6.48 |

*Primary Examiner*—Peter C. English
*Attorney, Agent, or Firm*—Brown, Pinnisi & Michaels, P.C.

[57] ABSTRACT

A riding mower or other like four-wheel vehicle has the two front wheels mounted off the cantilever end of a subframe which is pivotably attached to the underside of the main frame of the vehicle by two spaced part pivots lying along the vehicle length axis. A cutter deck is suspended from the main frame beneath the subframe. The subframe construction resists bending forces, due to front-to-back and vertical forces on the dropped-down front wheels, when they encounter obstacles or depressions. The main frame is made of steel tubing, and provides a generally rectangular space just forward of the driver's seat, suitable for placement of the driver's feet. Preferably, the subframe also has a generally rectangular opening, nominally aligned with the main frame opening, to also accommodate the driver's feet. The elevation of the driver's seat can thus be desirably lowered, to maintain a low center of gravity.

12 Claims, 4 Drawing Sheets

RIDING MOWER WITH PIVOTING FRONT WHEEL ASSEMBLY

This application claims the benefit of U.S. Provisional Application No. 60/022,865, filed Jul. 27, 1996.

TECHNICAL FIELD

The present invention relates to motor vehicles for cutting grass lawns, and for other agricultural and recreational use; in particular, it relates to suspension systems for four wheeled rotary lawn mowers.

BACKGROUND

There are a great variety of commercially available machines for mowing lawns and related landscape and agricultural purposes. A popular kind of machine comprises a frame, a wheel at each of the four corners, a rotary mower cutter deck more or less centrally located between the wheels, and an operator seat proximate the rear two wheels. Typically, the two rear wheels are driven to move the mower, and they support the preponderance of the machine and operator weight.

Different means are used for steering such vehicles. Preferred is the so-called transmission steer machine, where the mower has two freely pivotable front wheels; and directional control, or steering, is obtained by applying differential power to the two independently driven rear wheels.

Rider mowing machines must give good results for a variety of terrains. It is more difficult in general to mow slopes and undulating surfaces. In particular, when traversing across a slope, there tends to be an imbalance in downward force between the rear wheels, from which directional control can be lost, due to downhill shifting of the line of action of the machine center of gravity. Prior art machines, where the wheels are rigidly mounted at the corners of the vehicle, are particularly prone to this effect. This is because, as the machine moves forward, when one front wheel is lifted upward by a small undulation or obstacle, the load at the rear wheel directly behind is lessened. When the front wheel lifted is the uphill wheel, the already low downward force on the uphill rear wheel can become so low that no traction is maintained. As a result, the vehicle will tend to turn and run downhill.

There have been commercial machines in which the front axle is mounted off a center pivot. See for example, U.S. Pat. No. 3,686,840 to Root and U.S. Pat. No. 4,077,191 to Pittinger, Sr. et al. If such design is applied to transmission steerable machines, the above mentioned rear-wheel-lifting effect is avoided.

However, it also a feature of various prior art riding mowing machines that the front wheels will be dropped down from the primary elevation of the axle, whether pivoted or fixed. They will be attached to struts which extend downwardly from the outermost ends of the axle, for the obvious reason of permitting the use of smaller wheels while providing clearance for obstructions or a suspended rotary mower deck. While this configuration serves the intended purpose, when front wheels horizontally hit obstacles, the axle and the pivot point are subjected to very heavy bending moments which can and do cause failure. This necessitates either avoiding the pivot axle type of construction or providing unduly heavy and therefore undesirable pivots and structure.

Thus, there is a need for improved front suspension systems which better maintain contact of wheels with the surface of the earth and enable better control. It is in general a desire to keep overall machine length short, and to keep the center of gravity low; and thus any improvement ought be compatible.

SUMMARY

An object of the invention is to provide improved suspension systems for mowing machines and the like. Another object is to provide front wheel suspensions which are articulated to respond to uneven terrain, but which are more durable than prior designs. Another object is to provide an improved front wheel suspension system which enables the driver to sit as low as possible on the machine, for stability.

According to the invention a vehicle for mowing grasses and other purposes has a main frame, from which are mounted the rear wheels; and, a subframe, from which are mounted front wheels. The subframe is attached to the front end of the main frame at two longitudinally spaced apart pivots. The main frame is comprised of spaced apart members which define a generally rectangular space sufficient to receive the driver's feet, located just forward of the driver's seat which is mounted on the main frame. The subframe is mounted underneath the main frame, so the space for the driver's feet is not detracted from.

In further accord with the invention, a vehicle for mowing grasses has a main frame with front and rear support members, and spaced apart side members, to define a generally rectangular space. The main frame carries the rear wheels and the cutter deck. A subframe is comprised of front and rear transverse members with side members connecting them to form a generally rectangular subframe. The subframe mounts on the main frame by pivot connections between the respective transverse members and support members. The front wheels rotate about axes which have elevations lower than the elevation of the pivots.

Preferably, the subframe and main frame are of open construction, comprised of welded tubular members. The support and transverse members of the frames are spaced to provide a front to back length, s', so that the driver's feet may be accommodated just forward of the driver's seat which is mounted on the main frame. The lateral width of the space, between the side members of both the subframe and main frame, is also sufficiently wide for the driver's feet.

Preferably, the subframe cantilevers outwardly from the front end of the main frame by a distance d which is less than about 50% of the pivot to pivot spacing s; the pivot spacing s is more than 40% of the wheel base wb of the vehicle; and, the front wheels rotate about axes having an elevation which is dropped down a distance h from the elevation of the pivots, where h is less than about 50% of s.

Preferably, the invention is part of a transmission steerable vehicle having independent rear wheel suspension. The invention provides a mowing machine with a robust design, while at the same time allowing the front wheels to accommodate small rises and depressions without substantially affecting the cutter deck height.

The foregoing and other objects, features and advantages of the invention will become more apparent from the following description of the best mode of the invention and accompanying drawings.

DESCRIPTION

The present invention is described in terms of lawn mowing machines, but it will be understood that the invention is suited to other machines or vehicles for agricultural and recreational use. The preferred embodiment machine is constructed of welded steel plate and square tubing.

Figure 1:
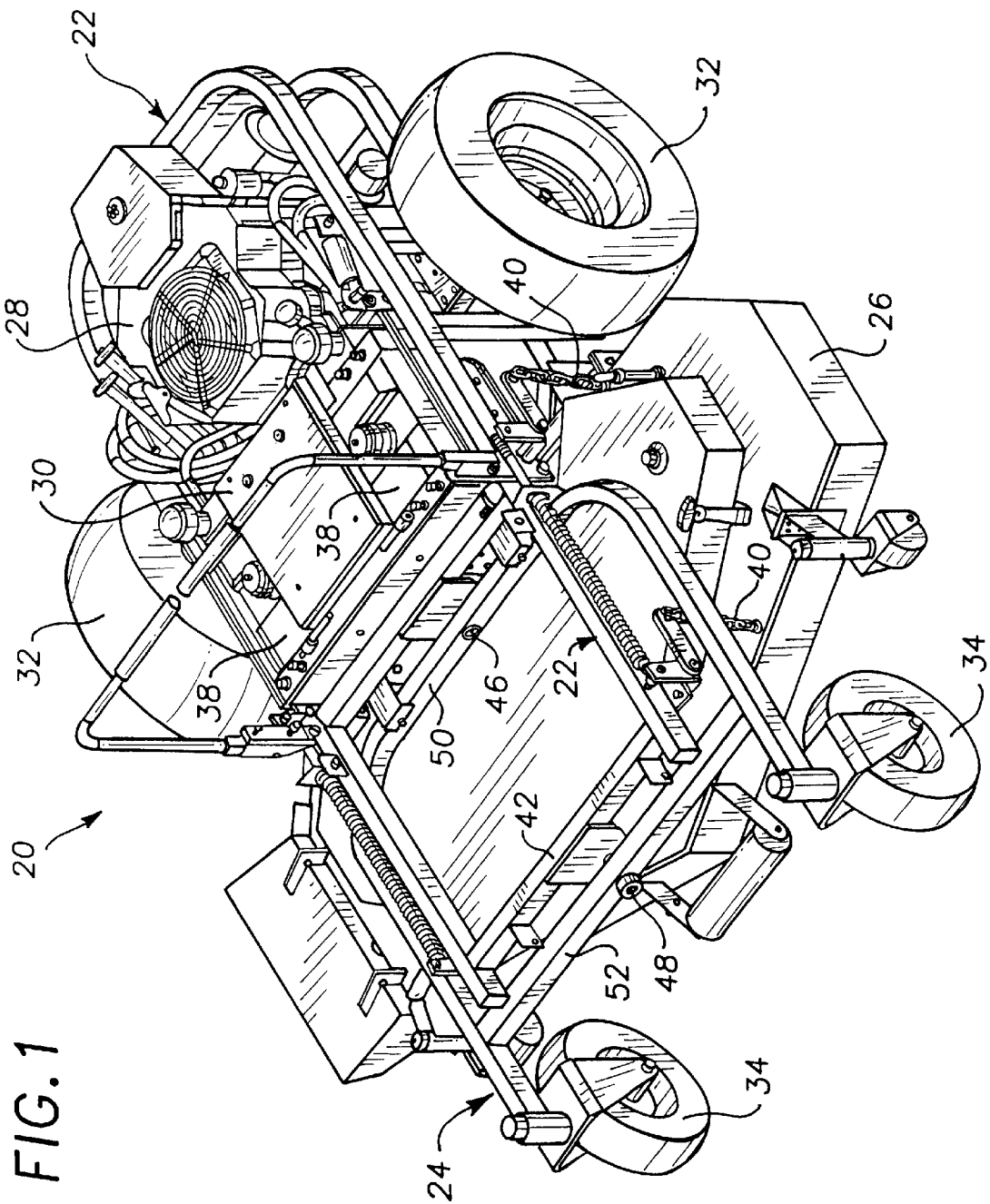
FIG. 1 shows in isometric view the innards of a rider mowing machine.
Figure 4:
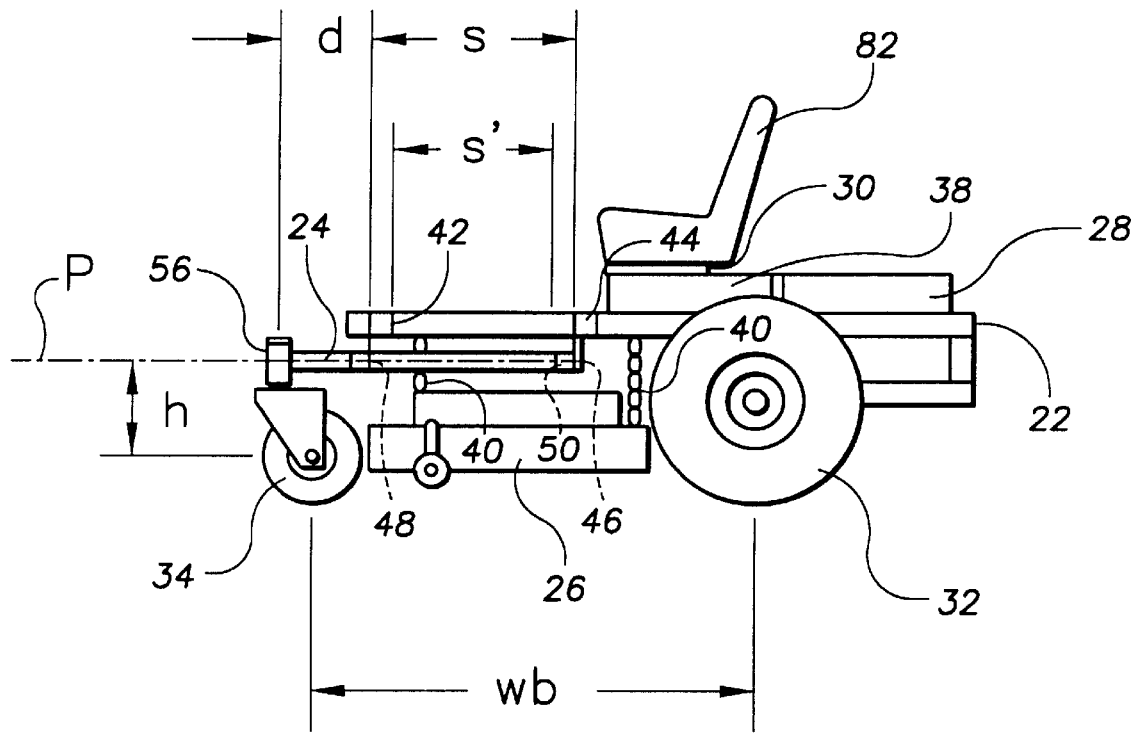
FIG. 4 is a side view of essential parts of the machine shown in FIG. 1.

FIG. 1 shows a mowing machine vehicle 20, with most of the sheet metal components removed. The machine is powered by a gasoline engine 28 which is connected through a hydraulic pump system—mostly hidden from view behind gasoline tanks 38—with independently driven rear wheels 32. Freely pivotable front wheels 34 are mounted on subframe 24 which is itself pivotable about a longitudinal axis of the vehicle. The front wheels enable the front of the vehicle to swing left and right when the rear wheels are driven at different speeds. Reference to FIG. 1 and FIG. 4 will show how a cutter deck 26, comprised of rotary blades spinning parallel to the plane of the earth within a housing, is adjustably suspended from the main frame 22 by chains 40 in the space between the front and rear wheels, in the normal manner of floating mower deck configurations. A driver's seat 82, shown in FIG. 4, mounts on the seat plate 30 shown in FIG. 1, atop the gas tanks.

Figure 2:
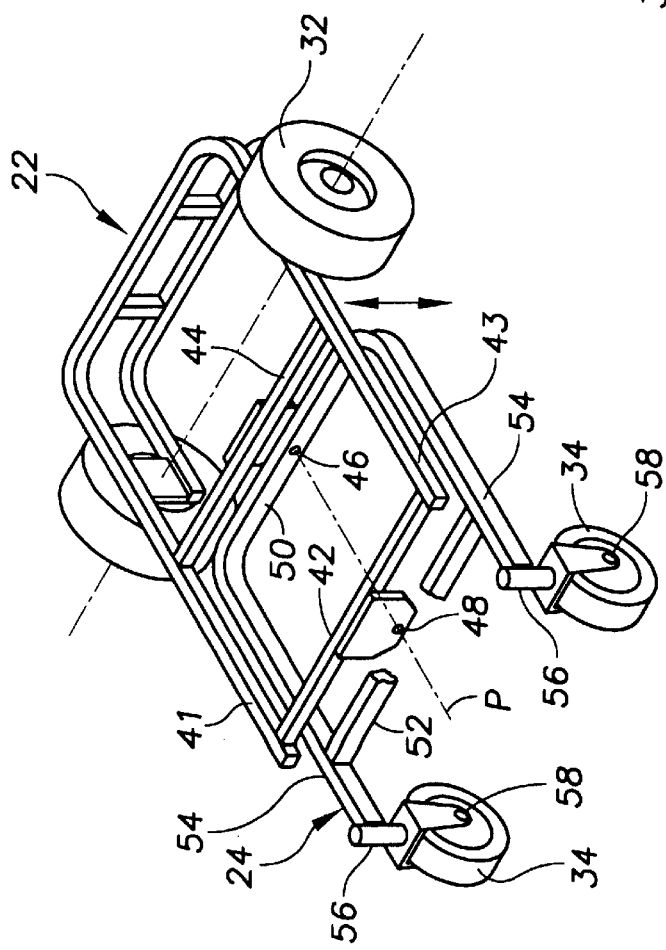
FIG. 2 is an isometric view of the main frame, subframe and wheels of the machine of FIG. 1.

FIG. 2 shows the essential elements of the main frame 22 and subframe 24, and how they are connected to each other. The rear part of the main frame 22 is supported by the drive wheels 32. The main frame has a generally rectangular open configuration. Near its midpoint and front end, two members run transverse to the length of the machine, namely front support member 42 and rear support member 44. Each member has an integral downward-extending plate which supports a pivot 46, 48. The pivots 46, 48 are aligned along a lengthwise axis P which runs along the length of the machine. Main frame side members 41 and 43 are spaced apart sufficient to accommodate the driver's feet.

Subframe 24 has an open rectangular shape, with a width somewhat wider than the main frame, and it has a front transverse member 52 and rear transverse member 50, both running perpendicular to the longitudinal pivot axis. Each transverse member is adapted to attach to the main frame 22 at one of the pivots, as shown, so that the subframe is enabled to rotate within planes transverse to the pivot axis P. See FIG. 3. The pivots can be of various manner of design. Preferably, a thick-wall sleeve is welded into each transverse member. The sleeve fits over a pin which projects from the plate of the support member. A nut on the threaded outer end of the pin retains the subframe transverse member in place.

The front ends of side members 54 of the subframe are cantilevered forward of the front transverse member and front pivot, to support the front wheels. The free turning front wheels 34 are mounted on axles 58. The axes of rotation of the wheels about wheel axles 58 are at an elevation lower than the elevation of the pivot axis P. Axles 58 are supported off brackets which are attached to trunnions 56 that enable free rotation of the wheel axle about the vertical trunnion axis and within the horizontal plane of the machine.

Figure 3:
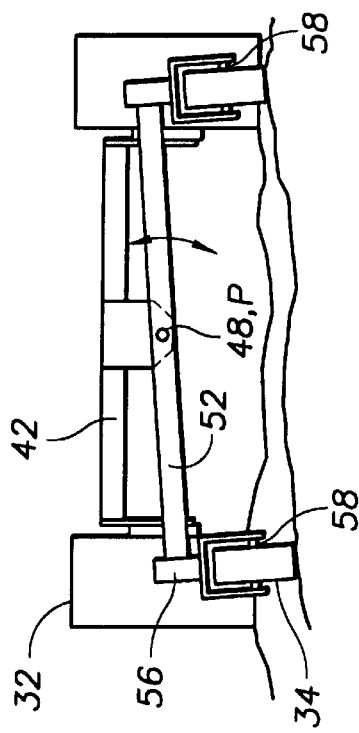
FIG. 3 is a front view of the structure in FIG. 2.

In use, as illustrated by FIG. 3, the subframe can rotate relative to the rear frame. And, when one front wheel encounters a rise or bump relative to the opposite front wheel, the subframe rotates, thus lessening the tendency to lift the rear wheel. Since the mowing deck is supported from the rear frame, the tendency for movement of the deck relative to the surface being mowed is desirably minimized.

The front-rear spaced apart pivot supports of the subframe enable the machine to resist forces resulting from a front wheel encountering an abrupt obstacle—when there are upward and rearward forces applied to the wheel. Any upward force on the cantilever part of the subframe from the wheels is transmitted through side members 54 and is resisted by upward force on the subframe at the rear pivot. Any rearward thrust on a wheel creates a bending moment about the front pivot 48. This moment is resisted by downward force on the subframe at the rear pivot. There are of course related couple and shear forces at the front pivot, as elementary mechanical analysis would indicate. But the forces at the front and rear pivots in all instances are much less than the forces which would be present at a pivot were the wheels to be supported by a single axle fastened at only one pivot, as in the prior art.

FIG. 4 shows a side view of the essential parts of the mowing machine 20 and indicates preferred geometric relationships. The distance s between the subframe pivot 46, 48 is preferably at least 40% of the vehicle wheelbase wb, to provide good mechanical advantage. The rear pivot is also placed proximate the front edge of the driver seat 82, so that the length s' of the front-to-back opening, between the subframe rear transverse member 50 and the main frame front support member 42 is sufficient to accommodate the driver's feet.

The length d of cantilever of the subframe, to trunnions 56 from the front pivot, preferably is less than about 50 percent of the pivot spacing s, providing good mechanical advantage for the subframe to resist bending moment when a wheel is suddenly lifted or dropped. Generally, it is desirable to minimize both wb and d, to keep the overall length of the vehicle to the minimum necessary to accommodate the cutter deck, so the vehicle is most maneuverable. The axles 58 of the front wheels 34 are an elevation distance h beneath the pivot axis, which distance is preferably less then about 50 percent of the pivot spacing s, providing good mechanical advantage to the pivot connections in resisting bending moments when a wheel hits something in front of it. The foregoing geometric relationships can be quantified in normalized terms as s=3.5, s'=3.3, wb=8, h=1.5 and d=1.5, where s' is sufficient to accommodate a driver's feet, nominally 12 inches or more. The distance s is optionally more than one half the vehicle's wheelbase wb.

The side members 54 of the subframe are desirably spaced apart, at a width equal or greater than the spacing apart of the lengthwise members of the main frame, i.e., minimally 12 inches, preferably 18 inches and more, to provide space above the mower deck for placement of the driver's feet. Generally, a sheet metal piece will fit into the space, attached to the main frame, so the driver's feet will not rest on the deck. It is in general desirable to seat the driver as low as possible to lower center of gravity, and to have his legs extend vertically down for comfort. The subframe is somewhat wider than the main frame, with the front wheels outboard of the main frame and aligned with the inner edges of the rear wheels. Due to the rear wheel suspension system, the rear wheels are displaced laterally outboard of the main frame.

Although the open tubular construction shown is preferred for light weight and low cost, other constructions of the main frame and subframe can be employed within the scope of the invention. While the generally rectangular subframe in FIGS. 1–4 is shown mounted underneath the main frame, a less preferable alternative is to have the subframe mounted so it is above the main frame.

Figure 5:
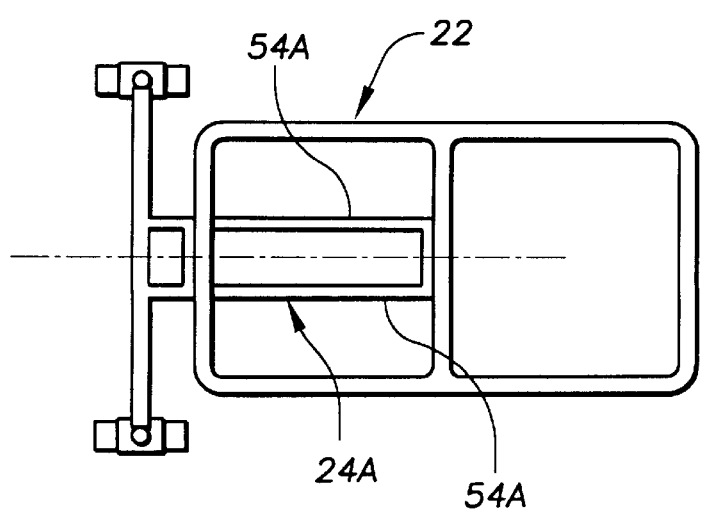
FIG. 5 is a top view of an alternate embodiment subframe with the main frame.
Figure 6:
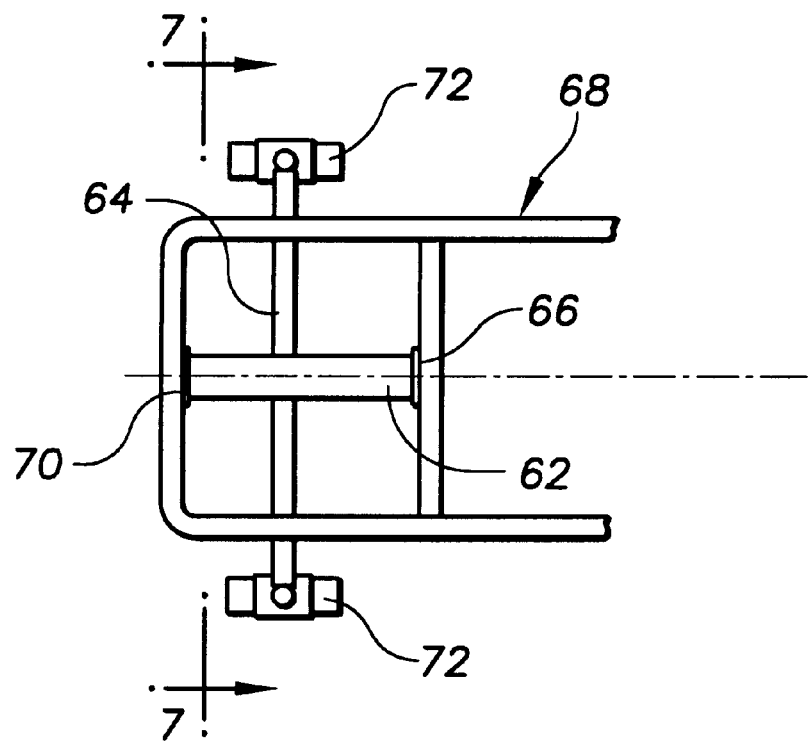
FIG. 6 is a top view like FIG. 5 of another embodiment.
Figure 7:
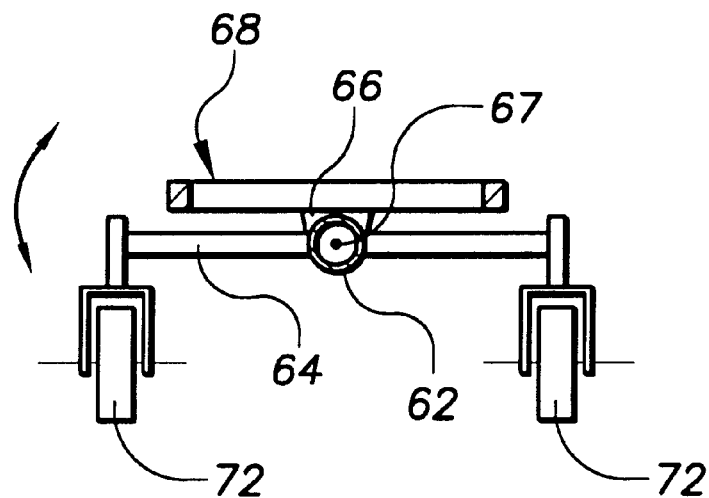
FIG. 7 is a cross sectional view taken along line 7—7 in FIG. 6.

In the generality of the invention, the subframe is pivotably connected at substantially spaced apart points along the length of the vehicle. FIG. 5 shows an embodiment where the side members 54A of a narrow width subframe 24A are close together, connected by transverse members, pivoted off the main frame 22, as previously described. Less desirably a single member may be substituted for the two members 54A, as shown in FIG. 6. FIG. 6 and the cross sectional view of FIG. 7 show a lengthwise member, tube 62, connected at pivots (pivot 67 shown in FIG. 7) mounted on downward extending weld-plates 66, 70, of the cross members of the main frame 68. Extending transversely from, and attached to, tube 62 is a transverse member 64, to the outer ends of which are attached pivoting wheels 72, in a manner like that described above.

The configurations of FIGS. 5 and 6 are less desirable than the open rectangular subframe of FIGS. 1–4, since they make the permissible elevation of the driver foot space higher than in the preferred embodiment, and they are for like reason unsuitable for mounting above the main frame. However, when combined with the open construction and spaced apart support members of the main frame, or when maximum foot space is not needed, the alternatives still are useful. Other design variations to achieve the essential advantage of the preferred embodiments may be contemplated.

The invention may be used on a machine where the rear wheels are fixedly attached to the main frame. More preferably, the rear wheels are independently suspended from the rear frame to provide further advantages. While the invention is described in terms of wheels symmetrically positioned at front and rear, the invention also will be applicable to configurations which have a degree of asymmetry. While the invention is described in terms of the transmission steer machine, the invention may be applied to machines which have steerable front wheels.

Although only the preferred embodiment has been described with some alternatives, it will be understood that further changes in form and detail may be made without departing from the spirit and scope of the claimed invention.

I claim:

1. A vehicle for agricultural and recreational uses comprising:

a main frame having a front end, a rear end, and a front support member and a spaced apart rear support member connected by spaced apart side members; the members defining a generally rectangular space sufficient to receive a vehicle driver's feet;

each support member having a pivot, the pivots being aligned and spaced apart along a lengthwise axis of the vehicle;

a driver's seat, mounted on the main frame rearward of the rear support member, positioned so a vehicle driver may place his or her feet in said rectangular space;

at least two rear wheels attached to the rear end of the main frame;

means for rotating the rear wheels, mounted on the main frame;

a subframe, pivotably attached to the main frame at said spaced apart pivot points, the subframe comprising at least one lengthwise member running parallel to said lengthwise axis of the vehicle and at least one transverse member running transverse to said lengthwise axis, the subframe members connected to each other; and, at least two front wheels, one each mounted at an opposing end of the transverse subframe member; wherein the subframe is positioned underneath the front end of the main frame.

2. The vehicle of claim 1 wherein the at least one transverse member and the at least one lengthwise member comprise two spaced apart transverse members and two lengthwise members, the members connected to each other to form a generally rectangular subframe, wherein the subframe is pivotably attached to the main frame at the center point of each transverse member.

3. The vehicle of claim 1 wherein the at least one lengthwise member comprises a single lengthwise member pivotably connected at each end to one of the support members of the main frame.

4. A vehicle for mowing grasses and other agricultural uses comprising:

a main frame having a front end, a rear end, and a front support member and a spaced apart rear support member connected by spaced apart side members, the members defining a generally rectangular space;

the front and rear support members having respective front and rear pivots; the pivots aligned along a lengthwise axis of the main frame;

rear wheels attached to the rear end of the main frame;

means for rotating the rear wheels, mounted on the main frame;

an integral subframe, comprising spaced apart front and rear transverse members and spaced apart side members joining the subframe transverse members to form a generally rectangular shape, pivotably attached to the front end of the mainframe for pivoting of the subframe about said lengthwise axis;

wherein, the subframe front transverse member is pivotably connected to the main frame at the front pivot, and the subframe rear transverse member is pivotably connected to the main frame at the rear pivot; and, two front wheels attached to the front of the subframe, the wheels having central rotational axes lying beneath a level of said pivots.

5. The vehicle of claim 4, further comprising:

a driver seat mounted on the main frame, proximate to and rearward of the rear support member;

wherein the side-to-side spacing between the side members of the main frame and subframe, and the front to back spacing between the subframe transverse members and the main frame front and rear support members, are sufficient to accommodate the feet of a driver seated on said seat.

6. The vehicle of claim 5 wherein the subframe is located beneath the main frame.

7. The vehicle of claim 5 further comprising: a cutter deck suspended from the main frame, in a vicinity of said pivots, for mowing grasses.

8. The vehicle of claim 4 wherein the subframe cantilevers forward from the location of the front pivot; and wherein the front wheels are attached to a cantilever portion of the subframe.

9. The vehicle of claim 8 wherein the front wheels are attached to the subframe by trunnions extending vertically downward from the cantilever portion of the subframe, the trunnions enabling free turning of the wheels within a horizontal plane; wherein the front wheels rotate about horizontal axles connected to said trunnions; wherein a horizontal distance (d) between the trunnions and the front pivot is less than about 50% of a spacing (s) between the front and rear pivots.

10. The vehicle of claim 4 wherein the front wheels rotate about horizontal axes lying in a horizontal plane beneath said lengthwise axis; wherein a distance (h) between said lengthwise axis and a plane of said horizontal axes is less than about 50 percent of a spacing (s) between said front and rear pivots.

11. The vehicle of claim 4 wherein the vehicle rear wheels lie along a first axis and the vehicle front wheels lie along a second axis, a distance (wb) between the first and second axes being a wheelbase of the vehicle; wherein a distance (s) between the pivots is more than one half the vehicle wheelbase.

12. A vehicle for mowing grasses and other agricultural uses comprising:
   a) a main frame having a front end, a rear end, and a front support member and a spaced apart rear support member connected by spaced apart side members, said members defining a generally rectangular space;
   b) said front and rear support members having respective front and rear pivots; said pivots aligned along a lengthwise axis of said main frame;
   c) first and second rear wheels attached to said rear end of said main frame;
   d) means, mounted on said main frame, for rotating said rear wheels;
   e) a subframe, wherein
      i) said subframe includes spaced apart front and rear transverse members, and spaced apart first and second side members joining said subframe transverse members to form a generally rectangular shape such that said first and second side members include first and second extended sections that extend beyond an intersection of said first and second side members with said front transverse member;
      ii) said subframe front transverse member is pivotably connected to said main frame at said front pivot;
      iii) said subframe rear transverse member is pivotably connected to said main frame at said rear pivot; and
   f) first and second front wheels attached to said first and second extended sections of said first and second side members of said subframe, said wheels having central rotational axes lying beneath a level of said pivots.

* * * * *